United States Patent
Nicewonger (10) Patent No.: US 6,185,466 B1
(45) Date of Patent: Feb. 6, 2001

(54) DISTRIBUTED DIGITAL CONTROL SYSTEM INCLUDING MODULES WITH MULTIPLE STORED DATABASES AND SELECTOR

(75) Inventor: Mark R. Nicewonger, Aptos, CA (US)

(73) Assignee: Proteus Industries, Inc., Mountain View, CA (US)

( * ) Notice: Under 35 U.S.C. 154(b), the term of this patent shall be extended for 0 days.

(21) Appl. No.: 08/944,745

(22) Filed: Oct. 6, 1997

(51) Int. Cl.[7] ................................................. G05B 11/01
(52) U.S. Cl. ............................. 700/19; 700/2; 700/18; 700/83; 713/1; 713/2; 713/100; 709/201; 709/213; 709/222
(58) Field of Search ........................ 700/2, 3, 17, 18, 700/19, 20, 21, 22, 83, 86; 713/1, 2, 100; 709/201, 213, 222; 719/10

(56) References Cited

U.S. PATENT DOCUMENTS

| | | | |
|---|---|---|---|
| 4,656,593 | * 4/1987 | Gleba et al. | 700/295 |
| 5,193,189 | * 3/1993 | Flood et al. | 395/650 |
| 5,249,140 | * 9/1993 | Kessler | 700/3 |
| 5,469,150 | * 11/1995 | Sitte | 340/825.07 |
| 5,506,767 | * 4/1996 | Naylor | 700/11 |
| 5,530,643 | * 6/1996 | Hodrowski | 364/191 |
| 5,550,980 | * 8/1996 | Pascucci et al. | 395/200.05 |
| 5,764,509 | * 6/1998 | Gross et al. | 364/149 |
| 5,796,607 | * 8/1998 | Le Van Suu | 700/11 |
| 5,801,942 | * 9/1998 | Nixon et al. | 364/149 |
| 5,838,563 | * 11/1998 | Dove et al. | 364/188 |
| 5,909,368 | * 6/1999 | Nixon et al. | 364/131 |

* cited by examiner

Primary Examiner—Paul P. Gordon
Assistant Examiner—Ramesh Patel
(74) Attorney, Agent, or Firm—Arter & Hadden, LLP; David G. Alexander, Esq.

(57) ABSTRACT

A distributed digital control system includes a plurality of control modules which are interconnected by a communication link. Each module includes a processor unit for running a control program, and a plurality of system databases which correspond to nodes in the system. Each module further includes a selector such as a Dual Inline Package (DIP) switch for inputting a node number. The program automatically selects the database corresponding to the input node number when the module is powered up. The system preferably utilizes the industry standard LonTalk® protocol, with each database including Standard Network Variable Types (SNVTs) and Standard Configuration Parameter Types (SCPTs) for the respective node. A default database is also stored in each module, which is automatically used by the program if the system databases are not found.

32 Claims, 5 Drawing Sheets

DISTRIBUTED DIGITAL CONTROL SYSTEM INCLUDING MODULES WITH MULTIPLE STORED DATABASES AND SELECTOR

BACKGROUND OF THE INVENTION

1. Field of the Invention

The present invention generally relates to the art of industrial control systems, and more specifically to a distributed digital control system including modules with multiple stored databases and a selector.

2. Description of the Related Art

A simple digital control system includes a single processor or controller to which various input and output devices such as sensors and actuators are connected. The controller is programmed to make decisions and control the actuators based on information obtained from the sensors. This type of system is typically implemented with a microprocessor based controller, with its sensors and actuators in relatively close proximity to facilitate their direct connection to the controller electronics.

In cases where the sensors and/or actuators are not located near the controller, a transmission medium or communication link is employed to transmit information between the controller and the remote devices. Conventional transmission media include 4 to 20 milliamp current loops, simple digital serial interfaces such as RS-232, and Local Area Networks (LAN), with the controller being located at a central point.

A distributed control system uses multiple controllers instead of a single central controller. The system functions are segmented into discrete tasks and divided between the various controllers. The information necessary to coordinate the overall system is then communicated between the controllers by a medium which is suitable for the particular application, such as a shared memory space, or more typically a LAN.

There are two ways to organize distributed control systems; client/server and peer to peer. In a typical client/server system, one of the controllers functions as a server and the remaining controllers function as clients. The server acts a system coordinator. All shared information is located at the server and may not be passed directly between clients. Conventional office computer networks and the Internet are examples of client/server systems.

In a peer to peer system, communication takes place directly between the processors without having to go through an immediate server. Controllers exchange information using special program variables known as system variables. Changes in the value of a system output variable on one controller are communicated to another controller's system input variable, and thus the same value is maintained for both variables. Not all system output variables are communicated to all system input variables, but those variables that are communicated are said to be "connected" or "bound". The establishment of these connections is referred to as binding. Peer to peer systems are typically used in distributed control applications such as factory automation or building energy control systems.

Controllers in a peer to peer system often have their program functions divided into discrete units known as objects. Each object can have one or more system input or output variables. Objects are designed to be general purpose building blocks which may be used in various combinations to achieve a desired system function. Although each individual object has a fixed function, the overall operation or relationship of the objects to one another, as defined by the system variable connections, is not fixed, but may be changed to accomplish the desired system level result. Objects may also have operating parameters which may be specified in each instance to adjust for varying operating conditions.

A systems designer typically uses a computer program, referred to as a management tool, to define the system variable connections and the operating parameter values for each of the objects on the controllers. When a new controller is installed, it must be configured by the management tool before it can assume any role within the system. This is true both when the individual controllers are first brought together as a system, and whenever a controller is replaced for maintenance reasons. Therefore, the presence of a management tool, and its operator, is required both at the initial assembly point and the field service point.

For many distributed control systems, the two management points (assembly and service) are one and the same. This is true when a system is not physically moved to another location after it is installed. A good example of this is a factory automation system, where it is practical for the same management tool and operating personnel to be used for both system installation and maintenance.

For an Original Equipment Manufacturer (OEM) product which incorporates an embedded distributed control system, the two management points are not the same, and both present problems which many times make such systems impractical. At the assembly point, systems are installed not only once, as in the factory automation case, but over and over again, each time the product is assembled, thus complicating the manufacturing process. The larger problem, however, is at each remote point to which the product is shipped, where a management tool and qualified operator are required for field service.

Each controller in a distributed system requires three types of memory: a program memory which is a non-volatile storage space containing the program instructions which direct the operation of the controller, and is often implemented using read-only memory, and a scratch-pad memory which is a random access memory used for intermediate values (results of calculations, program stack, etc.) that do not have to be permanently stored. These first two memory types are universal to all microprocessor based controllers.

The third type of memory, unique to distributed controllers, is a system database. The system database is a record of the system variable connections and the operating parameter values for each object on the controller. This memory must be non-volatile to preserve the information which determines the overall operation of a system, and is usually a read/write type memory to enable database updates. The role of a management tool is to generate the information to be contained in the system database, and to transfer the information into the controller's system database.

One way to completely eliminate the need for a management tool in an OEM system is to put the system database into non-volatile read-only memory. This is sometimes referred to as a pre-configured system. One drawback to this is that many or all of the controllers within the system are often exactly the same physically, with the only distinction between them being the contents of the system database.

Placing a different system database into each controller's read-only memory forces the stocking and labeling, at both manufacturing and field service points, of a separate unit for each of the controllers, which can be not only cumbersome, but confusing since the controllers all look for the same. This is contrasted to stocking only a single item, which is used in multiple instances, for systems using a management tool to update the system database each time a controller is installed.

A second drawback to pre-configured systems is inflexibility. An OEM may ship systems to multiple customers, with each one requiring a different system database configuration. This again comes down to an inventory control issue, since the stocking problems described above are now multiplied by the number of customers.

SUMMARY OF THE INVENTION

The present invention overcomes the drawbacks of an OEM system by combining the simplified stocking requirements of a typical distributed control system with the advantage of a pre-configured system which does not need a management tool. The present invention accomplishes this goal by maintaining a duplicate copy of each controller's system database on every controller of the same type in the system. Each controller stores not only its own single system database, but a number of system databases equal to the number of similar controllers in the system. Dissimilar controllers do not need to share each other's databases since they are physically different.

An input device is provided on each controller to function as a database selector. The selector input can be implemented in a variety of ways, from a simple switch array to a keypad and display where the selector value can be entered by the installer and saved in memory. A special management tool loads the multiple system databases into each controller as required. Thereafter, each controller assumes its proper role in the system by using the databases designated by the selector. Thus, each controller can take the place of any controller of the same type in the system, by simply changing the database selector.

Although a management tool is still required to initially load databases to the controllers, the disadvantages to an OEM are avoided. Databases can be loaded into the system database memory at the time the controllers are manufactured, much the same as the program memory must be loaded. The controllers arrive at the system assembly and field service points with the only installation requirement being to properly set the selector device. No management tool is required at either the manufacturing final assembly or field service points.

A distributed digital control system embodying the present invention which accomplishes this goal includes a plurality of control modules which are interconnected by a communication link. Each module includes a processor unit for running a control program, and a plurality of system databases which correspond to nodes in the system. Each module further includes a selector such as a Dual Inline Package (DIP) switch for inputting a node number. The program automatically selects the database corresponding to the input node number when the module is powered up. The system preferably utilizes the industry standard LonTalk® protocol, with each database including binding information for the Standard Network Variable Types (SNVTs) and values for the Standard Configuration Parameter Types (SCPTs) for the respective node. A default database is also stored in each module, which is automatically used by the program if the system databases are not found.

More specifically, the present distributed digital control system includes a plurality of control modules and a communication link interconnecting the modules. Each module includes a digital processor unit, memory for storing a digital control program which is executed by the processor unit for controlling the module, and a plurality of module databases corresponding to identification numbers respectively.

Each module further includes a selector for inputting an identification number, the program being configured to control the module using a database corresponding to the identification number input by the selector. The program is configured to sense the selector and select the database corresponding to the identification number input by the selector when the module is powered up.

These and other features and advantages of the present invention will be apparent to those skilled in the art from the following detailed description, taken together with the accompanying drawings, in which like reference numerals refer to like parts.

DETAILED DESCRIPTION OF THE INVENTION

A distributed digital control system embodying the present invention is commercially available from Proteus Industries, Inc., of Mountain View, Calif., the assignee of the present invention, under the product name FluidTalk™. The system measures the flow rate, temperature and pressure of liquid in industrial equipment cooling systems. However, the present invention is not limited to cooling system control or any other particular application, and can be adapted to any environment in which distributed digital control is required.

Figure 1:
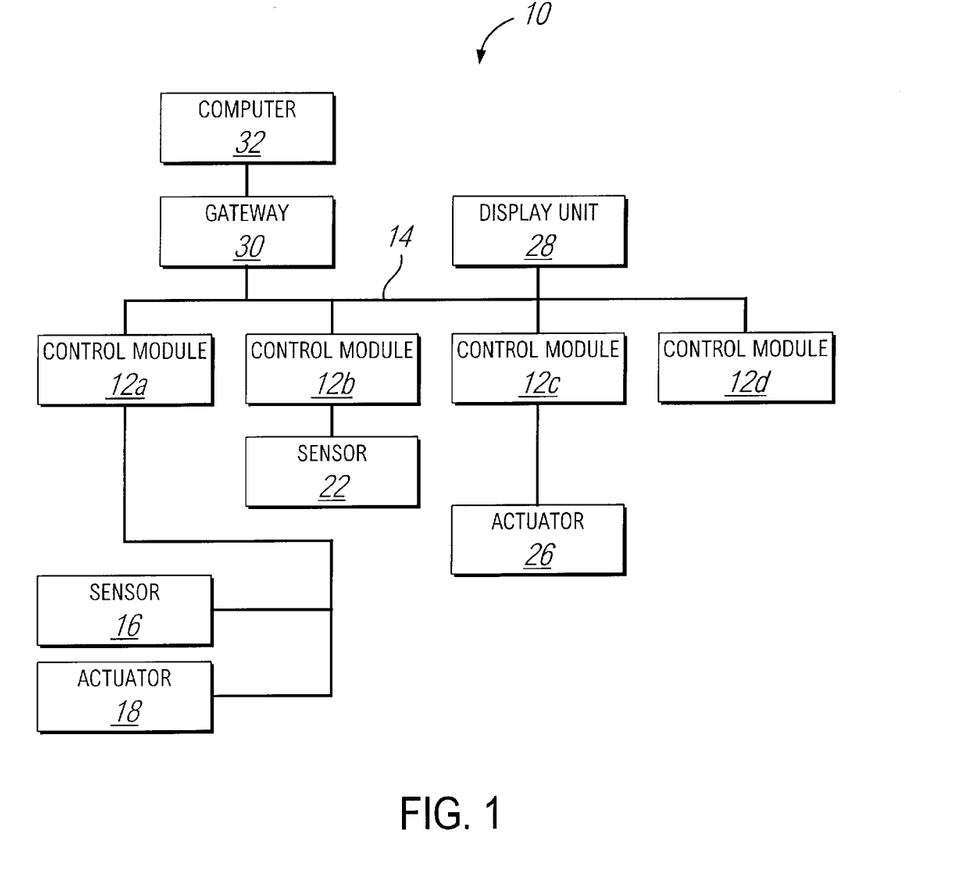
FIG. 1 is a block diagram illustrating a distributed digital control system embodying the present invention.

As illustrated in FIG. 1, a distributed digital control system 10 embodying the invention includes a plurality of control modules 12a, 12b, 12c and 12d which constitute nodes of the system 10 and are interconnected by a communication link 14 such as a LAN. As illustrated in FIG. 1 modules 12a, 12b, 12c and 12d are of the same type and construction, although the system 10 can additionally include modules of different types such as a display unit 28.

Each sensor unit 12a, 12b, 12c and 12d typically has at least one input and/or output connected to a sensor or actuator. The arrangement of control modules, sensors and actuators is entirely flexible and can be selected in accordance with a particular application. As shown in the example of FIG. 1, the module 12a has an input connected to an output of a sensor 16 which is constructed to sense fluid pressure, temperature, flow, etc., and outputs connected to inputs of an actuator 18 which may for example, open or close a or valve. The controller 20 can, for example, control fluid flow. The module 12b is illustrated as having an input connected to an output of a sensor 22, whereas the module 12c an output connected to an input of an actuator 26.

The display unit 28 is connected to the link 14 for displaying parameters that are transmitted between the modules 12a, 12b, 12c and 12d. Although not explicitly shown, the display unit 28 is provided with a display screen for displaying, for example, values that are sensed by the sensors 16 and 22.

The system 10 further includes a gateway 30 in the form of a handheld unit which is connected to the link 14. The gateway 30 serves as a link between the sensor units 12a, 12b, 12c and 12d and a computer 32 such as a conventional personal computer. In this capacity the gateway 30 enables the computer 32 to function as a management tool to configure the sensor units 12a, 12b, 12c and 12d as will be described below. The gateway 30 is also capable of functioning as a management tool for configuring the sensor units 12a, 12b, 12c and 12d without the computer 32.

Figure 2:
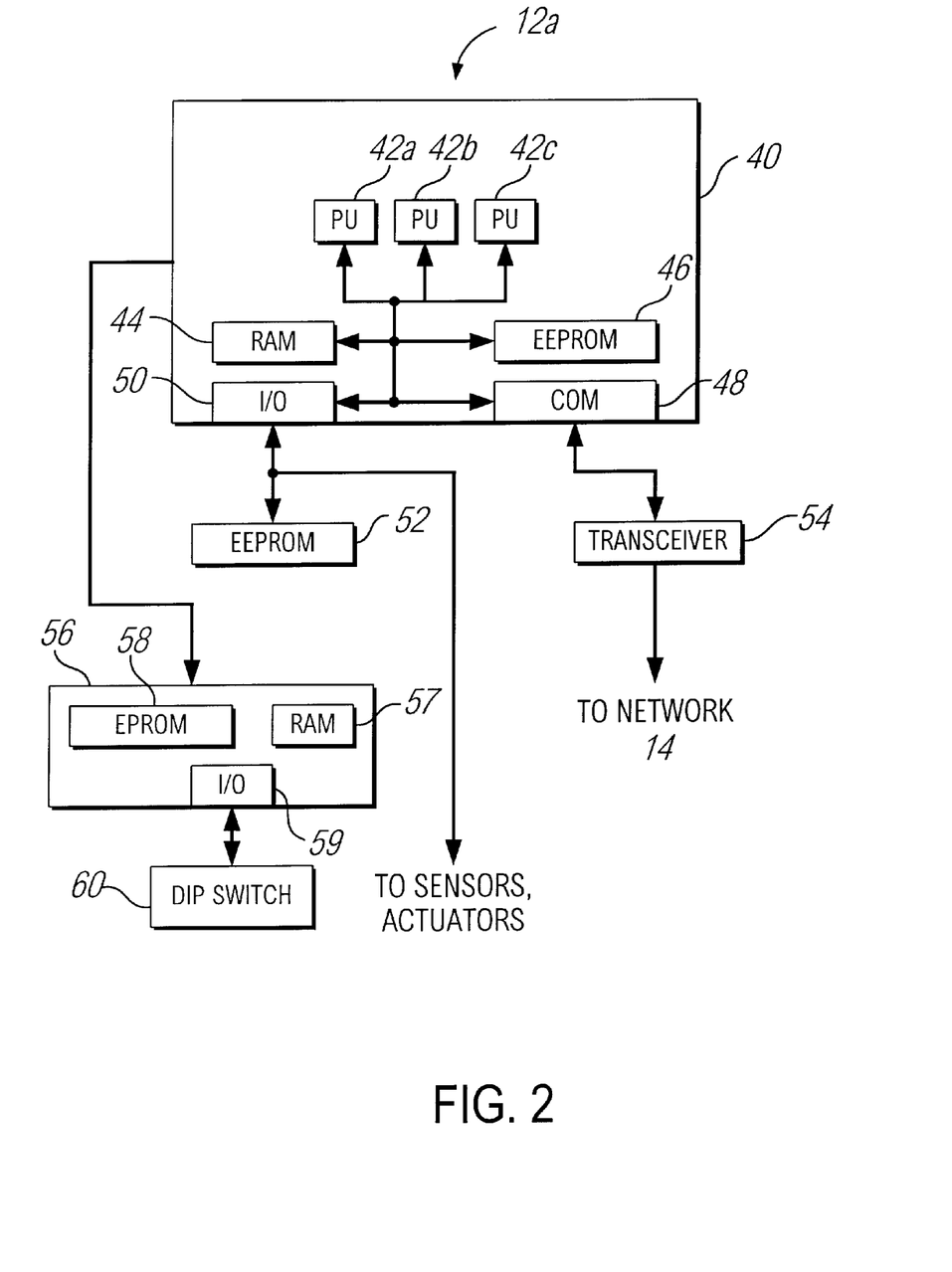
FIG. 2 is a block diagram illustrating a control module of the system.

The module 12a (the modules 12b, 12c and 12d are the same as the module 12a) is illustrated in FIG. 2. The module 12a preferably includes a processor unit 40 in the form of a Neuron® chip which is commercially available from the above referenced Echelon Corporation. The unit 40 generally includes three pipelined processors 42a, 42b and 42c for concurrent processing of application program code and network packets (the method of data communication between the modules 12a, 12b, 12c and 12d), a Random Access Memory (RAM) 44 for buffering network data and storing network variables, an internal Electrically Erasable Programmable Read-Only Memory (EEPROM) 46, a communications port 48 for network connection, and an Input/Output port 50 for connection to sensors, and actuators.

The module 12a further includes an external EEPROM 52 which is connected to the I/O port 50, and a transceiver 54 which is connected between the communications port 48 and the link (LAN) 14. The unit 12a also includes a programmable peripheral unit 56 having its own EPROM 58, RAM 57 and additional I/O port 59 which is connected to the processor unit 40.

An input or selector which is preferably in the form of a Dual Inline Package (DIP) switch 60 is connected to the I/O port 59. It will be understood that the selector configuration is not limited to a switch, but can be embodied as a keypad and display or any other suitable means. The selector can also be a register, memory or other electrical unit into which a numerical value can be entered by an external handheld unit or other suitable means.

The modules 12a, 12b, 12c and 12d, display unit 28 and gateway 30 communicate with each other over the link 14 using the industry standard LonTalk® protocol which was developed by the Echelon Corporation of Palo Alto, Calif. This protocol is an Open Systems Interconnection (OSI) arrangement which performs file transfer via network data packets using a model consisting of 7 layers. The protocol per se is not the particular subject matter of the present invention and will not be described in detail.

The program and variable data used by the system 10 includes program code in the form of the program objects which are provided as firmware in the EPROM 58, operation data, and any other necessary program code. The operation data establishes the Standard Network Variable Types (SNVTs) and Standard Configuration Parameter Types (SCPTs) which are used by the modules 12a, 12b, 12c and 12d.

The firmware code for the program objects in combination with the operation data and any other necessary code constitute a control program which is executed by the processor unit 40 for controlling the module 12a. The control program and variable data are stored in what will be collectively referred to as "memory". The memory can conceivably be one integral unit, but is preferably segmented into distributed functional elements as will be described below. It will be understood that the memory allocation for program code and data is not limited to the illustrated embodiment, but can be arranged in any suitable configuration depending on a particular application.

Figure 3:
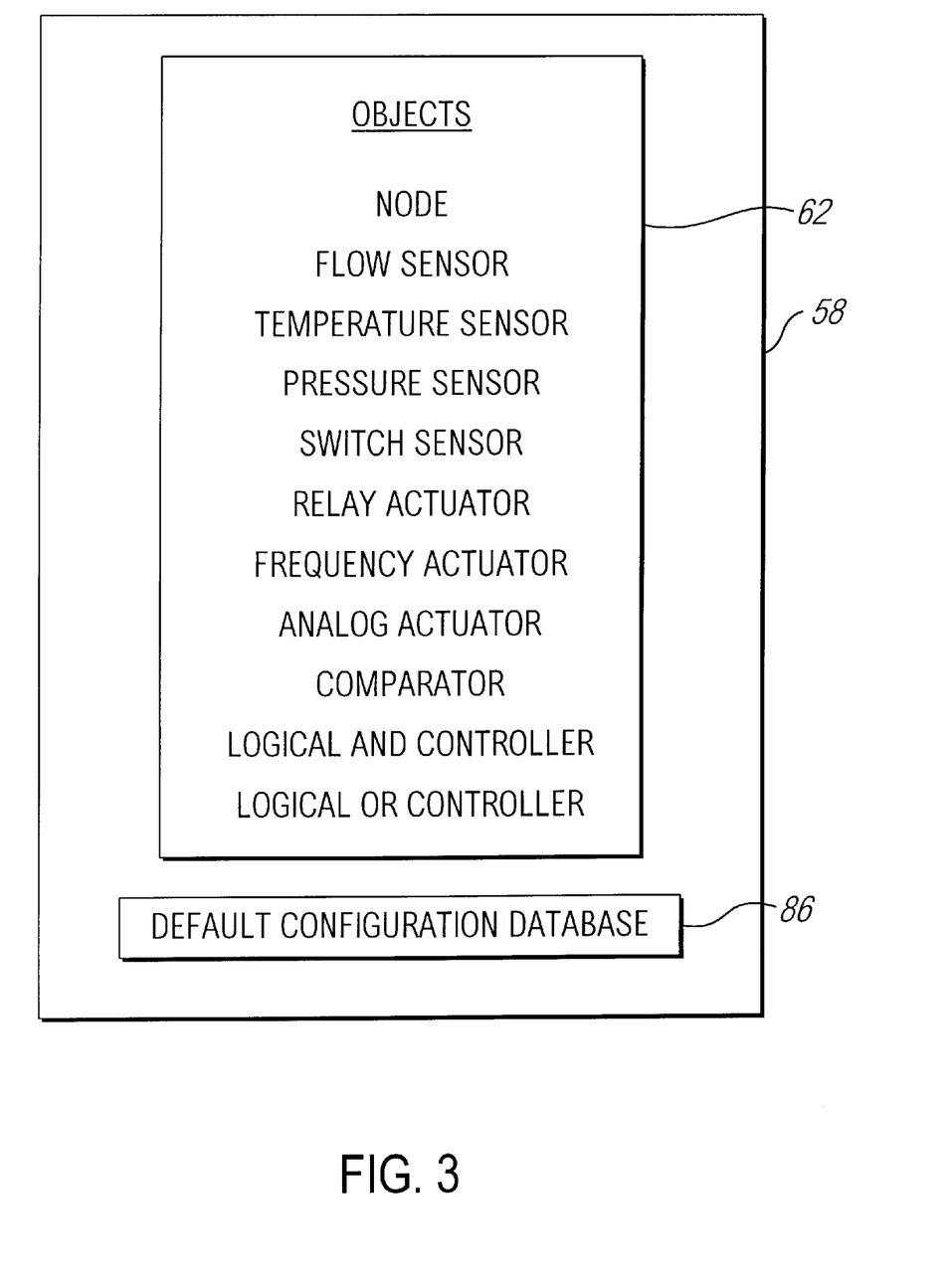
FIG. 3 is a diagram illustrating program data and default configuration data stored in a programmable peripheral memory of the control module of FIG. 2.

In the preferred embodiment of the invention, a plurality of program objects 62 are stored in the EPROM 58 in the programmable peripheral unit 56 as illustrated in FIG. 3. The objects 62 include a node object, one of the key tasks of which is to perform configuration database management functions such as communicating database files over the link 14, to and from the computer 32, via the gateway 30 and selecting the proper database for the particular module 12a based on the value of the selector device 60.

The objects 62 also include one or more objects which are executed by the processor unit 40 to implement the functionality of a sensor, actuator, controller, etc. As illustrated in the drawing, the objects 62 include, in addition to the node object, flow sensor, temperature sensor, pressure sensor, switch sensor, relay actuator, frequency actuator, analog actuator, comparator, logical AND controller, and logical OR controller objects.

Figure 4:
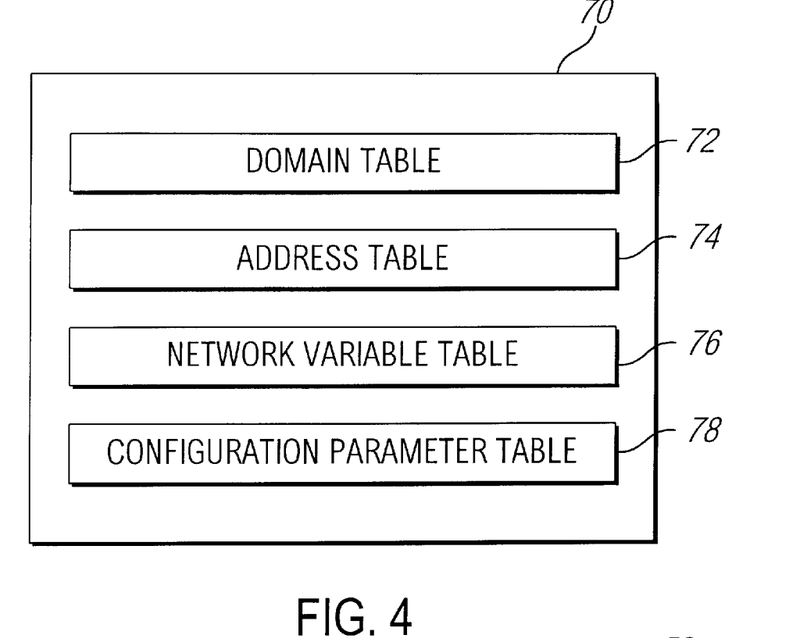
FIG. 4 is a diagram illustrating a configuration database or configuration data set.

As described above, each node (module) in the system requires a configuration database containing the information for implementing the functionality of the particular node. As illustrated in FIG. 4, an exemplary database 70 includes a domain table 72 and an address table 74 which in combination with a network variable table 76 defines the binding of the network variables between the nodes of the system 10, and also a configuration parameter table 78 contains the operating values of the Standard Configuration Parameter Type (SCPTs) which define how the objects 62 are configured.

Figure 5:
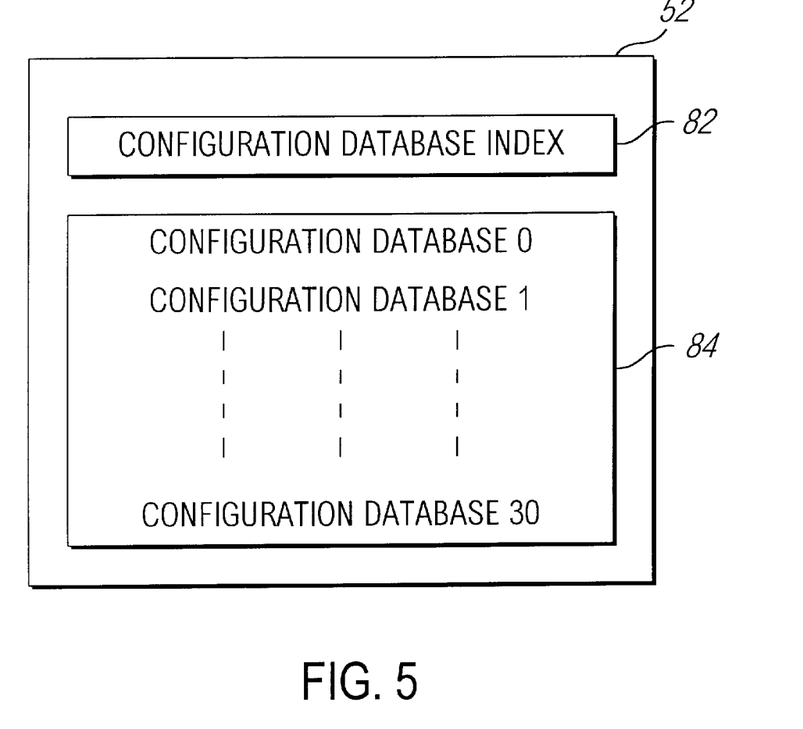
FIG. 5 is a diagram illustrating data stored in an external EPROM memory of the control module.

As illustrated in FIG. 5, the external EEPROM 52 stores a configuration database index 82, and a plurality of configuration databases 84, each of which has the configuration illustrated in FIG. 4. In the FluidTalk product, each module stores 31 databases for 31 respective nodes, although the invention is not limited to any particular number of databases.

The illustrated arrangement enables the system 10 to automatically configure itself when the modules 12a, 12b, 12c and 12d are connected in the system 10 and powered up. This is accomplished by setting an identification number which corresponds to the node number into each of the modules 12a, 12b, 12c and 12d using the selector or DIP switch 60. More specifically, the switch elements in the DIP switch 60 are set to correspond to the binary value of the node number. In the exemplary case of 31 nodes and corresponding databases, the DIP switch 60 will have at least five switch elements, each corresponding to a respective binary digit or power of two.

When the module 12a is powered up, the control program senses the DIP switch 60 to determine the binary identification number constituted by the positions of the individual switch elements. The program uses the identification number as an offset into the database index 82 illustrated in FIG. 5, which maps identification numbers to the individual databases 84. For example, if the identification number is 00011 (decimal 3), the control program will access the database index 82 with the base number of the index 82 in the EEPROM 52 plus the offset 00011. The value found at this address in the index 82 will be the number of the configuration database in the EEPROM 52 to be used by the module 12a.

The module 12a will then operate using the database which was selected as described above. In this manner, the module 12a automatically configures itself with the proper database upon power-up in accordance with the identification number which was input using the DIP switch 60. This enables any module 12a, 12b, 12c and 12d to assume the functionality of any node in the system 10 merely by inputting the appropriate node number using the DIP switch 60.

The configuration databases 84, together with the database index 82 can be directly programmed into the external EEPROM 52 at the time of manufacture of the module 12a. The preferred practice is to download the databases and index by way of the file transfer mechanism embodied the modules 12a's node object 62, using the gateway 30 and computer 32. It is further within the scope of the invention to download this data on-site after the system has been physically installed.

If the databases are to be downloaded into the EEPROM 52 using the file transfer protocol, the EEPROM 52 will not initially have a database therein to bind the module 12a to the gateway 30. For this reason, a default configuration database set 86 is stored in, for example, the EPROM 58 as illustrated in FIG. 3. If the control program detects that the databases 84 are not present, it operates using the default database 86 and thereby has an initial configuration that will enable file transfer and downloading of the databases 84.

Although it is within the scope of the invention for the processor 40 to access the selected database directly from the EEPROM 52, use of the Neuron chip dictates that the selected database be copied from the external EEPROM 52 into the internal EEPROM 46 of the processor unit 40 and access the database in the EEPROM 46. The control program's node object 62 performs this operation upon power-up and detection of the identification number.

Figure 6:
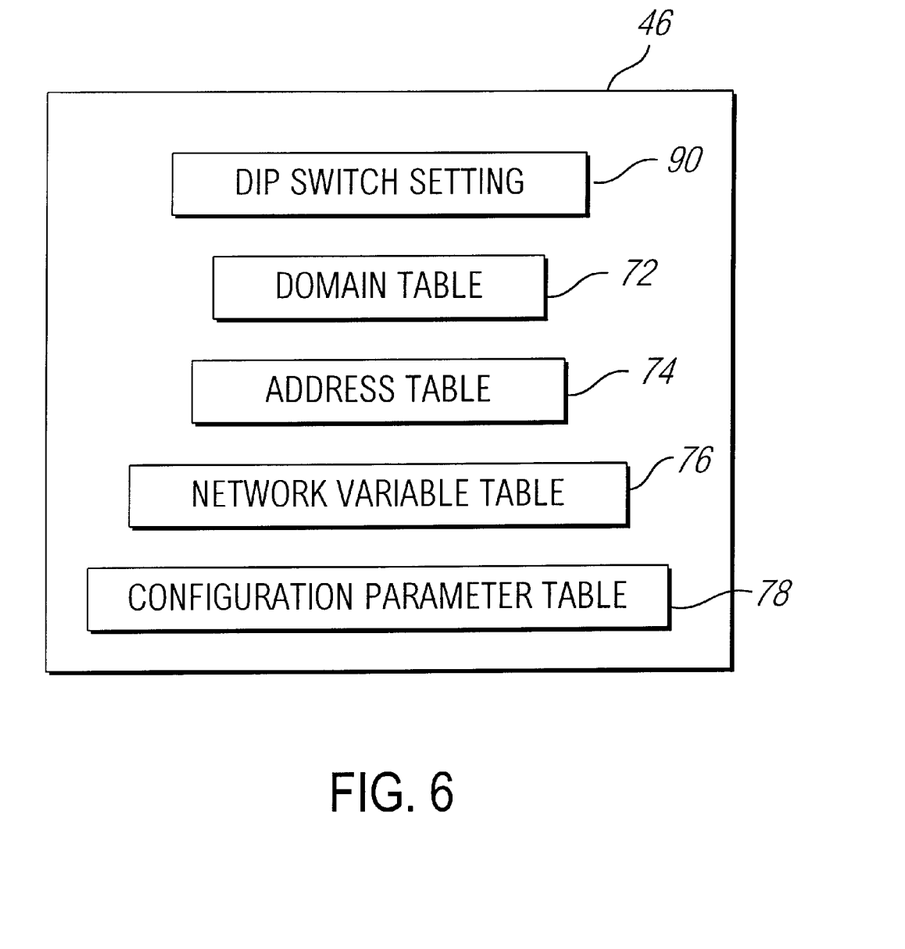
FIG. 6 is a diagram illustrating data stored in an internal microprocessor EPROM memory of the control module.

As illustrated in FIG. 6, the selected database, comprising a domain table 72, address table 74, network variable table 76 and configuration parameter table 78 are stored in the EEPROM 46. Further stored is a dip switch setting 90 which is the identification number set in the DIP switch 60 the last time the module 12a was powered up.

The control program is able to determine if the databases 84 are present by examining the dip switch setting 90. This will have a certain value set in at the time of manufacture of the module 12a if the databases are not present. In this case, the control program will load and use the default database 86.

Although the default database 86 has been described and illustrated as being stored in the EPROM 58, the invention is not so limited. The default database can alternatively be stored in the internal EEPROM 46, the external EEPROM 52, or any other suitable memory location. It is further within the scope of the invention and actually embodied in the FluidTalk system to provide several default databases, which allows for multiple default operating modes.

In summary, the present invention overcomes the shortcomings of conventional distributed control systems as described above. Despite the advantages of distributed control systems, they are often impractical for OEM applications, being too difficult to manage either at the system database level for systems which must be installed with a management tool, or at the inventory control level for pre-configured systems. By maintaining multiple system databases at each controller which can be easily selected at installation time, the advantages of both pre-configured systems and management tool installed systems are afforded to the OEM.

Various modifications will become possible for those skilled in the art after receiving the teachings of the present disclosure without departing from the scope thereof.

What is claimed is:

1. A distributed digital control system, comprising:
a plurality of control modules; and
a communication link interconnecting the modules;
in which each module includes:
a digital processor unit;
memory for storing a digital control program which is executed by the processor unit for controlling the module, and a plurality of module databases corresponding to identification numbers respectively; and
a selector for inputting an identification address number;
the program being configured to control the module using a database corresponding to the identification number input by the selector.

2. A system as in claim 1, in which, in each module, the program is configured to sense the selector and select the database corresponding to the identification number input by the selector when the module is powered up.

3. A system as in claim 2, in which the selector comprises a switch.

4. A system as in claim 2, in which:
the processor unit in each module comprises an internal memory; and
the program is configured to copy the database corresponding to the identification number input by the selector from said memory into the internal memory when the module is powered up.

5. A system as in claim 1, in which, in each module, the program is configured to, if said plurality of databases is not stored in said memory, control the module using a default database.

6. A system as in claim 5, in which the default database is stored in said memory.

7. A system as in claim 5, in which:
the processor unit comprises an internal memory; and
the default database is stored in the internal memory.

8. A system as in claim 1, in which:
at least one of the modules has a sensor input; and
the system further comprises a sensor having an output connected to the sensor input.

9. A system as in claim 1, in which:
at least one of the modules has a control output; and
the system further comprises an actuator having an input connected to the control output.

10. A system as in claim 1, in which the programs in the modules are configured to operate autonomously and communicate with each other.

11. A system as in claim 1, in which the program in one of the modules is configured to coordinate operation and intercommunication of all of the modules.

12. A system as in claim 1, further comprising a server which is connected to the communication link for coordinating operation and communication with the modules.

13. A system as in claim 1, in which the identification numbers comprise system node numbers respectively.

14. A control module for a distributed digital control system, comprising:
a digital processor unit;
memory for storing a digital control program which is executed by the processor unit for controlling the module, and a plurality of module databases corresponding to identification numbers respectively; and a selector for inputting an identification number;

the program being configured to control the module using a database corresponding to the identification number input by the selector.

15. A control module as in claim 14, in which the program is configured to sense the selector and select the database corresponding to the identification number input by the selector when the module is powered up.

16. A control module as in claim 15, in which the selector comprises a switch.

17. A control module as in claim 15, in which:

the processor unit comprises an internal memory; and the program is configured to copy the database corresponding to the identification number input by the selector from said memory into the internal memory when the module is powered up.

18. A control module as in claim 14, in which the program is configured to, if said plurality of databases is not stored in said memory, control the module using a default database.

19. A control module as in claim 18, in which the default database is stored in said memory.

20. A control module as in claim 18, in which:

the processor unit comprises an internal memory; and the default database is stored in the internal memory.

21. A control module as in claim 14, in which the module has a sensor input.

22. A control module as in claim 14, in which the module has a control output.

23. A control module as in claim 14, in which the program is configured to operate autonomously.

24. A control module as in claim 14, in which the program is configured to be coordinated by input signals.

25. A control module as in claim 14, in which the identification number comprises a system node number.

26. A method of incorporating a control module into a digital control system, comprising the steps of:

(a) providing a control module which includes:
  a digital processor unit;
  memory; and
  a selector for inputting an identification number;

(b) storing a plurality of module databases in said memory, the databases corresponding to identification numbers respectively;

(c) storing a digital control program in said memory for execution by the processor unit to control the module, the program being configured to control the module using a database corresponding to an identification number input by the selector;

(d) using the selector to input an identification number; and (e) operatively installing the module in the control system.

27. A method as in claim 26, in which:

step (c) comprises storing the program as being configured to sense the selector and select the database corresponding to the identification number input by the selector when the module is powered up; and step (e) comprises powering up the module.

28. A method as in claim 27, in which step (a) comprises providing the module such that the selector includes a switch.

29. A method as in claim 27, in which:

step (a) comprises providing the processor unit as including an internal memory;

step (c) comprises storing the program as being configured to copy the database corresponding to the identification number input by the selector from said memory into the internal memory when the module is powered up; and step (e) comprises powering up the module.

30. A method as in claim 26, in which step (c) comprises storing the program as being configured to, if said plurality of databases is not stored in said memory, control the module using a default database.

31. A method as in claim 30, further comprising the step, performed prior to step (e), of:

(f) storing the default database in said memory.

32. A method as in claim 30, in which:

step (a) comprises providing the module such that the processor unit comprises an internal memory; and the method further comprises the step, performed prior to step (e), of:

(f) storing the default database in the internal memory.

* * * * *